United States Patent
Kimura

(10) Patent No.: US 6,924,452 B2
(45) Date of Patent: Aug. 2, 2005

(54) WELDING DEVICE AND METHOD

(75) Inventor: Yutaka Kimura, Tokyo (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 0 days.

(21) Appl. No.: 10/850,421

(22) Filed: May 19, 2004

(65) Prior Publication Data

US 2004/0238496 A1 Dec. 2, 2004

(30) Foreign Application Priority Data

May 27, 2003 (JP) ........................................ 2003-149393

(51) Int. Cl.[7] ................................................. B23K 9/00
(52) U.S. Cl. ................ 219/61; 219/124.34; 219/125.11
(58) Field of Search ................................. 219/60 A, 61, 219/124.34, 125.11

(56) References Cited

U.S. PATENT DOCUMENTS

| | | | |
|---|---|---|---|
| 3,534,199 A | * 10/1970 | Downey et al. | .......... 219/60 A |
| 5,321,259 A | 6/1994 | Morgan | ........................ 250/236 |
| 5,347,101 A | 9/1994 | Brennan et al. | ............. 219/124 |
| 5,837,966 A | * 11/1998 | Timmons, Jr. | ............ 219/60 A |
| 6,559,405 B2 | * 5/2003 | Mehl | ......................... 219/60 A |

FOREIGN PATENT DOCUMENTS

JP 4-115104 4/1992

* cited by examiner

Primary Examiner—Clifford C. Shaw
(74) Attorney, Agent, or Firm—J.C. Patents

(57) ABSTRACT

A welding device and a welding method for butt welding two pipes to be welded are provided. The welding device comprises a welding device body, having an electrode unit with a welding electrode and a fixing clamp for holding the pipes to be welded; and electrode position indicating means for indicating a position of the welding electrode with respect to the pipes to be welded. The electrode position indicating means is capable of irradiating an indicating light to the pipes to be welded at the position corresponding to the welding electrode. Therefore, the positions of the butt edge surfaces of the pipes and the welding electrode can be easily and correctly consistent so as to perform a good welding.

6 Claims, 5 Drawing Sheets

WELDING DEVICE AND METHOD

CROSS-REFERENCE TO RELATED APPLICATION

This application claims the priority benefit of Japanese application serial no. 2003-149393, filed on May 27, 2003.

BACKGROUND OF THE INVENTION

1. Field of the Invention

This invention relates a welding device for butt welding pipes and a method thereof.

2. Description of Related Art

When gas supply pipes are laid from a gas supply source in a gas yard to a point of use in a clean room, pipes are fixed in the gas yard, on walls of buildings, in pipe spaces in the buildings and under floor of the clean room, etc. Since the supply pipes are usually laid along the walls of rooms or buildings, a portion of the pipes are laid perpendicular or parallel to the other portion of the pipes. When the laying position of the pipes can be freely selected, for example, laying the pipes under the floor, most of the pipes are laid perpendicular or parallel to the partitions of the room. If a portion of the pipes is tilted towards the other portion of the pipes, there will be a loss of space and a difficult maintenance job, and furthermore, the appearance will be affected. In laying the supply pipes, it is better to consider a clearance of the pipes and a minimum clearance has to be reserved for welding at the pipe-laying site. Therefore, a common method is that pipe units linked by welding a plurality of pipes are made at a clean booth where the clearance can be controlled, and then the pipe units are welded according to a place to be laid.

A Japanese Laid Open Publication 2000-334564 discloses a method for wilding pipes. In Japanese Laid Open Publication 2000-334564, a groove sensor, having an emitting unit and a receiving unit for a laser beam, is used to irradiate the laser beam to grooves formed at the end of a pipe. A groove shape is detected according to the laser beam that projects the groove and reaches the receiving section. Thereafter, a welding torch is arranged according to the position of the detected groove so as to weld the pipe.

However, according to the method disclosed by Japanese Laid Open Publication 2000-334564, since the groove position is detected according to the laser beam that projects the groove and then reaches the receiving unit, the detection accuracy of the groove position is low and the welding position might be deviated from the pipe end.

FIGS. 3 to 5 show an exemplary welding device used to weld a pipe. As shown, the welding device comprises a head unit 1, an electrode unit 2, a fixing clamp 3 for holding pipes 4, 5 to be welded and a cover plate 9 formed on the fixing clamp 3. The head unit 1 comprises a base 11, a first and a second extension portions 12, 12 respectively extending upwards from the two ends of the base 11. The electrode unit 2 comprises an arc-shaped rotation member 21 and a welding electrode 22 formed on the rotation member 21. The fixing clamp 3 comprises a first clamp 31 and a second clamp 32. The first clamp 31 is used to hold one pipe 4 to be welded, and comprises a first and a second holders 33, 34 for sandwiching the pipe 4 both top and bottom. The second clamp 32 is used to hold the other pipe 5 to be welded, and comprises a first and a second holders 37, 38 for sandwiching the pipe 5 both top and bottom. The first holders 33, 37 are respectively formed in a plate shape having a pipe-holding recessions 33a, 37a that are conformed to outer circumferences of the pipes 4, 5. The second holders 34, 38 are respectively formed in a plate shape having a pipe-holding recessions 34a, 38a that are conformed to outer circumferences of the pipes 4, 5. The cover plate 9 comprises a cover body 92 and a transparent protection plate 93. The cover body 92 includes a position-identification window 91 for identifying positions of butt edge surfaces 4a, 5a of the pipes 4, 5 to be welded, and the transparent protection plate 93 its used to cover the window 91. The welding device can place the butt edge surfaces 4a, 5a of the pipes 4, 5 to be welded in a substantially sealed space S encompassed by the head unit 1, the fixing clamp 3 and the cover plate 9.

The method of using the above welding device to subject the pipes 4, 5 to be welded to a butt welding is described below. As shown in FIG. 5, a distance a1 between the outer-rim surface of the first clamp 31 and the welding electrode 22 is measured and a distance a2 between the outer-rim surface of the second clamp 32 and the welding electrode 22 is measured. A position indicator (a marking line) 51 is formed by using a pen, etc. at a position apart from the butt edge surface 4a of the pipe 4 to be welded by the distance a1. Also, another position indicator (a marking line) 51 is formed at a position apart from the butt edge surface 5a of the pipe 5 to be welded by the distance a2.

The positions of the position indicators 51 are respectively set to the outer-rim surface of the first and the second clamps 31, 32, and the pipes 4, 5 is arranged between the extension portions 12, 13 of the head unit 1 and then held by the clamps 31, 32. In this way, the pipes 4, 5 to be welded are positioned in a manner that the butt edge surfaces 4a, 5a are butted to each other.

For performing a good quality welding, it is important that positions (positions in the axial direction of the pipes 4, 5, and refer to an axial position, hereinafter) of the butt edge surfaces 4a, 5a of the pipes 4, 5 to be welded and the welding electrode 22 are consistent. In the above method, the positioning of the pipes 4, 5 to be welded in the axial direction is performed by matching the position of the position indicators 51 with the clamps 31, 32. When positioning the pipes 4, 5 to be welded, whether or not the axial positions of the butt edge surfaces 4a, 5a and the axial position of the welding electrode 22 are consistent with each other is identified through the window 91 by the unaided eyes. For performing a good welding, an axial position difference between the butt edge surfaces 4a, 5a and the welding electrode 22 is preferably equal to or less than a thickness half of the pipes 4, 5. In general, it is better that the axial position difference is equal to or less than 1 mm, and preferably 0.5 mm. After the positioning operation is performed, the electrode unit 2 is rotated along the circumferential direction of the pipes 4, 5 to be welded and the entire circumferences of the butt edge surfaces 4a, 5a are welded by using the welding electrode 22. In this way, the pipes 4, 5 to be welded are subjected to butt welding.

The position of the welding electrode in the welding device is varied due to the device itself. The welding electrode is not located at the central position of the two clamps, and might be shifted from any one of the clamps. Therefore, the position indicator (the marking line) has to be formed every time to meet the direction of the welding device.

However, when performing the welding at the pipe setting site, the position indicator 51 is not easily formed at the correct position and with a suitable width because the working environment, such as the working area, is not suitable for welding. If the position indicator 51 is not form at the correction position, the positioning accuracy of the pipes 4, 5 to be welded is low and thereby adversely affecting welding quality. In addition, if the position indicator is too thick, positioning the pipes 4, 5 to be welded might be incorrect. If the position indicator 51 is too thin, it is very hard to visually identify and positioning of the pipes 4, 5 to be welded becomes difficult.

Additionally, there is usually a gap of about 0.5 to 3 mm between the pipes and the electrode. Therefore, when identifying the axial position of the butt edge surfaces 4a, 5a through the window 91, the correct axial position has to be confirmed from a front direction of the pipes 4, 5 to be welded (a direction perpendicular to the axial direction). However, when the working area at the pipe setting site is limited, it is difficult to identify the axial position from the front direction. In addition, the identification might become difficult in a dark pipe setting site. Therefore, it is not easy to correctly and consistently position the butt edge surfaces 4a, 5a and the welding electrode 22.

If the axial directions of the butt edge surfaces 4a, 5a and the welding electrode 22 are shifted, the welding metal does not reach the inner surface of the pipes at the butt edge surfaces 4a, 5a, and a recession caused by the pipe gap is created on the inner surface at a position equivalent to the butt edge surfaces 4a, 5a. In this case, particles, etc. will be accumulated at the recession, and therefore, impurities such as particles will be mixed with a supply gas. In addition, when the supply gas is an erosive gas used in semiconductor manufacture, etc., the pipe will be eroded from the recession, and metal erosion product created by the erosion might be mixed with the supply gas.

Since the appearance of the welded portion may be still of a good quality even though the welding was performed in a worse condition due to the position deviation, a worse welded pipe is difficult to distinguish. In addition, when the groove shape is a V or U shape, the target position of the electrode for a normal distance between the electrode and the pipe is different from target position of the electrode when the axial direction of the pipe is shifted. Therefore, the position deviation can be determined by monitoring an arc voltage. However, in a case of an I-shaped butt welding, since the distance between the pipe and the electrode does not vary even though a position deviation occurs, it is difficult to determine whether the welding is of good quality by monitoring the arc voltage. Therefore, a method capable of performing a good welding is desired. In particular, for a case of supply pipes used for high purity gas, toxic gas (Arsenic, etc.), combustible gas (silane, etc.) in the semiconductor manufacture, a precise welding is desired in order to prevent gas leakage or impurity invasion from the pipe.

SUMMARY OF THE INVENTION

According to the foregoing description, an object of this invention is to provide a welding device and a welding method for performing a butt welding operation capable of easily and correctly making the position of the welding electrode and the position of the butt edge surfaces of the pipes to be consistent.

According to the objects mentioned above, the present invention provides a welding device for butt welding two pipes to be welded. The welding device comprises a welding device body comprising an electrode unit with a welding electrode and a fixing clamp for holding the pipes to be welded; and electrode position indicating means for indicating a position of the welding electrode with respect to the pipes to be welded. The electrode position indicating means is capable of irradiating an indicating light to the pipes to be welded at the position corresponding to the welding electrode.

In one embodiment of the invention, the electrode position indicating means is capable of irradiating the indicating light to the pipes to be welded so that an irradiation position is consistent with a position of the welding electrode in an axial direction of the pipe. In addition, the welding device body is constructed to place a portion of the pipes including butt edge surfaces in a substantially sealed space. Furthermore, the electrode position indicating means can be detachably installed to the welding device body.

In one embodiment of the invention, a light passing opening is further formed on the welding device body for guiding the indicating light emitted from the electrode position indicating means into the welding device body, and an inner diameter of the light passing opening is smaller than the shortest diameter of the indicating light emitted from the electrode position indicating means.

The present invention further provides a butt welding method for welding two pipes to be welded. The method comprises steps of irradiating an indicating light to the pipes to be welded at a position corresponding to a welding electrode; positioning the pipes to be welded according to a irradiation position of the indicating light; and welding the two pipes by using the welding electrode.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings.

DESCRIPTION OF THE PREFERRED EMBODIMENT

Figure 1:
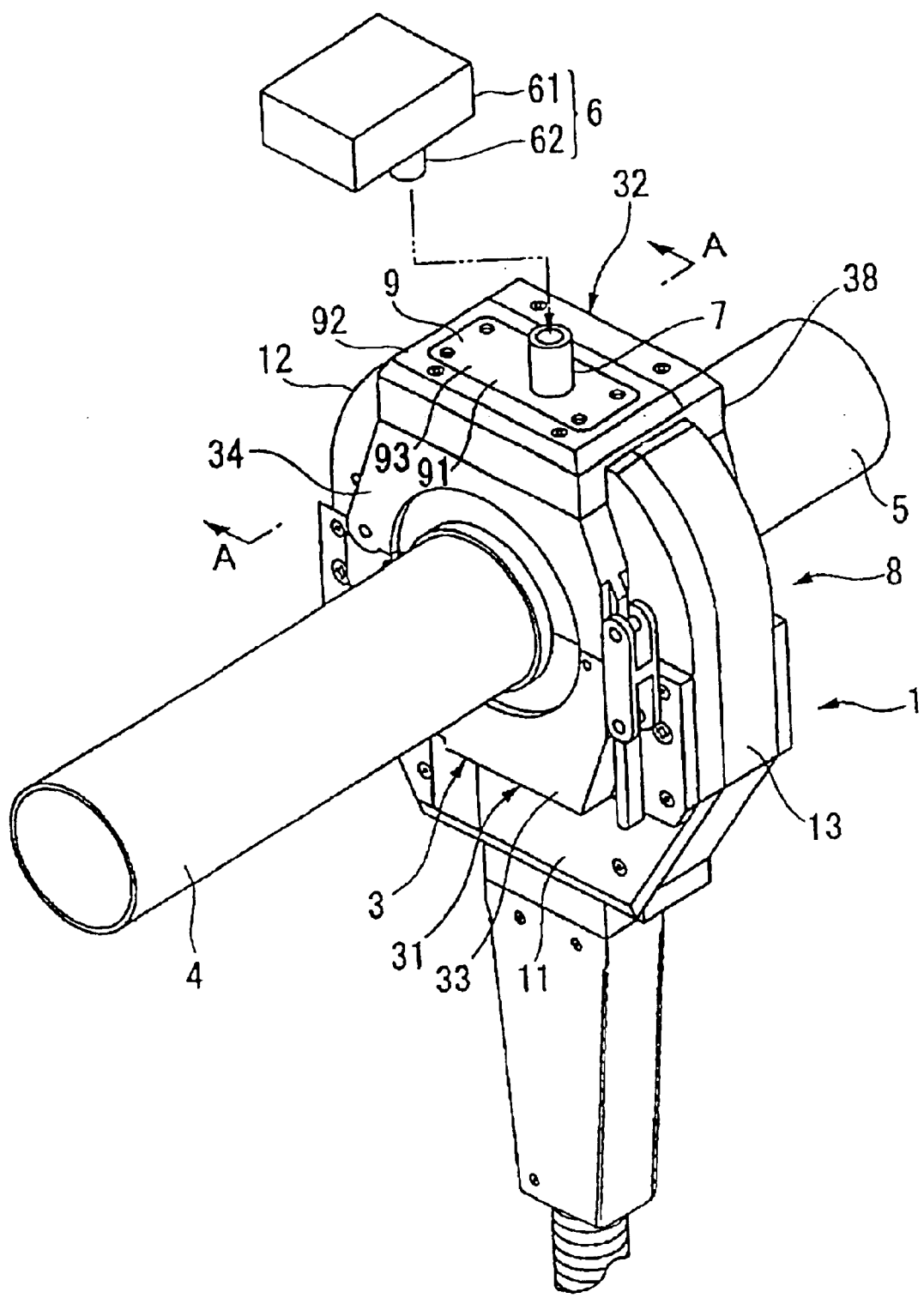
FIG. 1 is a perspective view of a welding device according to one embodiment of the present invention.
Figure 2:
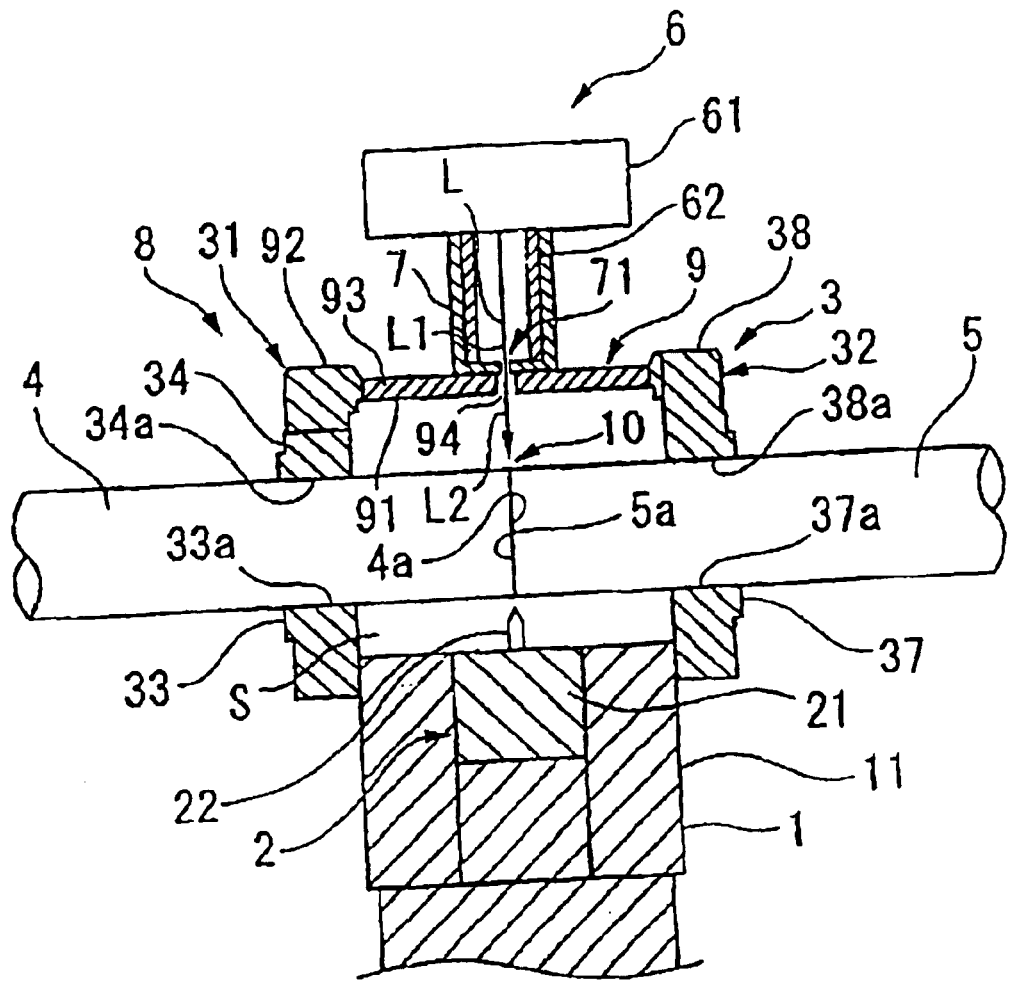
FIG. 2 is a cross-sectional view alone the line A—A of the welding device in FIG. 1.
Figure 3:
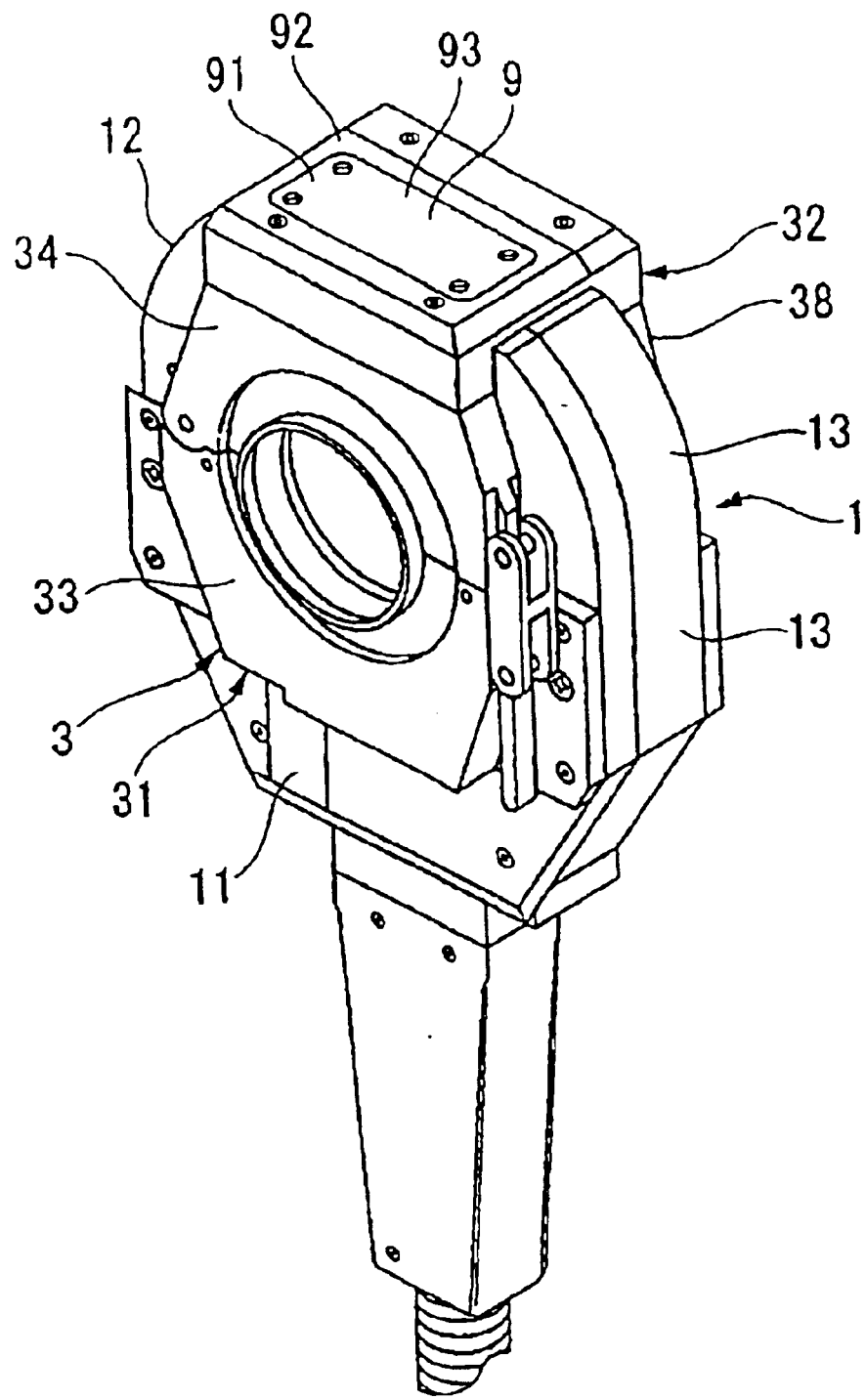
FIG. 3 is a perspective view showing a conventional welding device.
Figure 4:
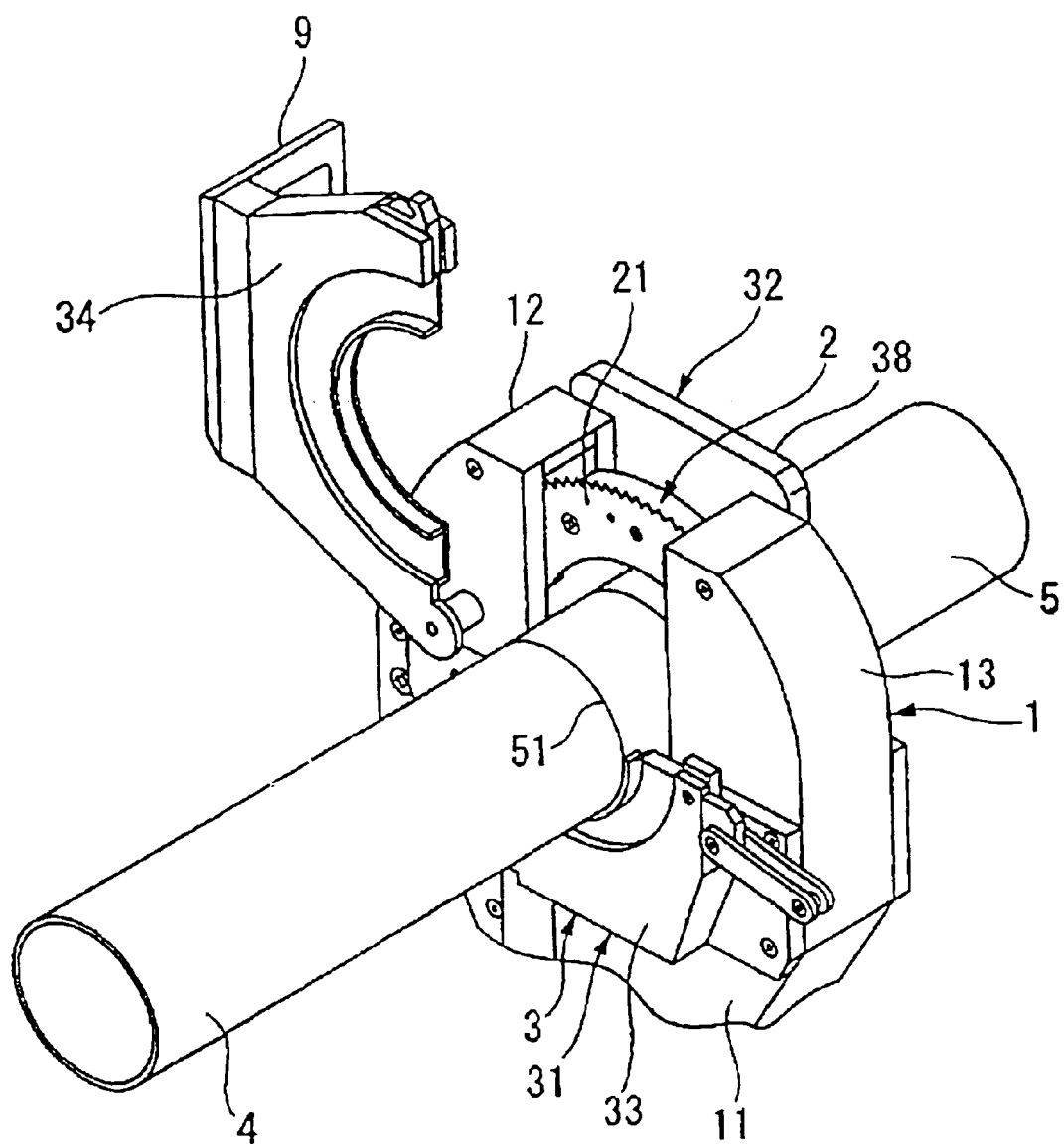
FIG. 4 is an enlarged diagram showing main parts of the welding device in FIG. 3.
Figure 5:
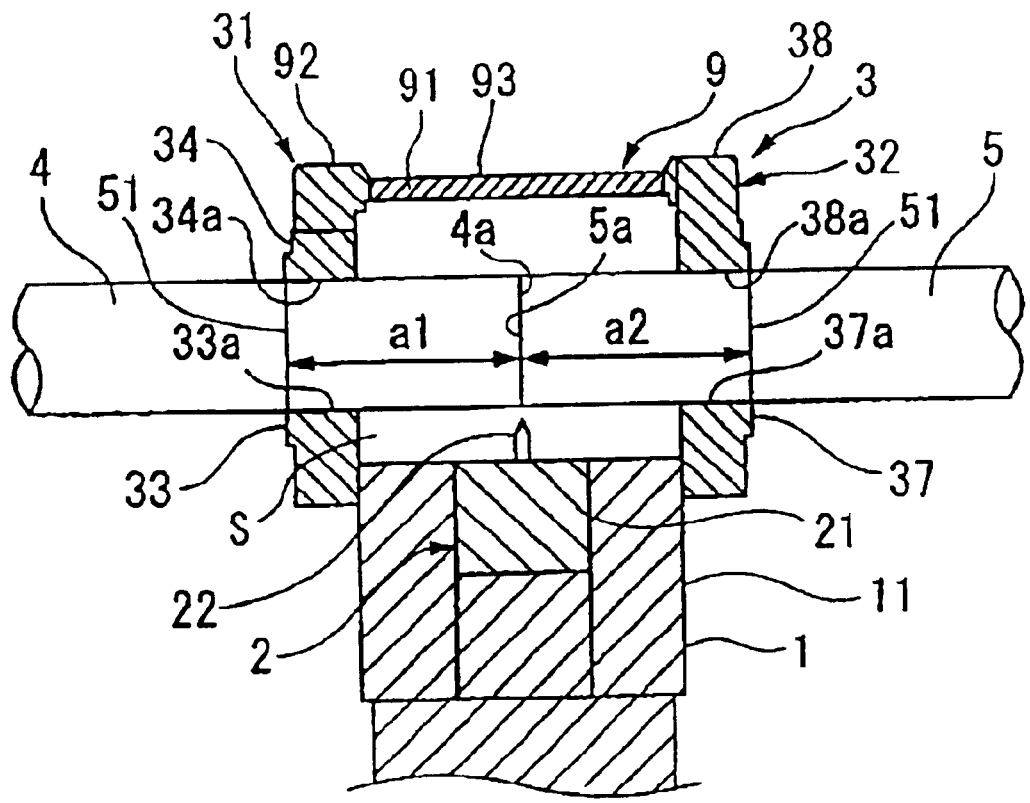
FIG. 5 is a cross-sectional view of the welding device in FIG. 3.

FIGS. 1 and 2 show a welding device according to one embodiment of the present invention. In the following description, elements common with the conventional welding device shown in FIGS. 3 to 5 are labeled with the same numeral, and their corresponding descriptions are omitted. At least one feature different from the conventional welding device is that the welding device of the present invention comprises electrode position indicating means 6 for indicating an axial position of the welding electrode 22 with respect to the pipes 4, 5 to be welded. The welding device comprises a welding device body 8 and electrode position indicating means 6 installed on the welding device body 8. The welding device body 8 comprises a head unit 1, an electrode unit 2, a fixing clamp 3 for holding pipes 4, 5 to be welded, a cover plate 9 formed on the fixing clamp 3, and an installation portion 7 formed on the cover plate 9.

The head unit 1 comprises a base 11, a first and a second extension portions 12, 12 respectively extending upwards from the two ends of the base 11. The electrode unit 2 comprises an arc-shaped rotation member 21 and a welding electrode 22 formed on the rotation member 21. The welding electrode 22 is formed to protrude from the inner side of the rotation member 21. The electrode unit 2 only moves along the circumferential direction of the pipe, and does not move in the axial and the radial directions of the pipe.

The fixing clamp 3 comprises a first clamp 31 and a second clamp 32. The first clamp 31 is used to hold a pipe 4 to be welded, and comprises a first and a second holders 33, 34 for sandwiching the pipe 4 both top and bottom. The second clamp 32 is used to hold the other pipe 5 to be welded, and comprises a first and a second holders 37, 38 for sandwiching the pipe 5 both top and bottom. The first holders 33, 37 are respectively formed in a plate shape having a pipe-holding recessions 33a, 37a that are conformed to outer circumferences of the pipes 4, 5. The second holders 34, 38 are respectively formed in a plate shape having a pipe-holding recessions 34a, 38a that are conformed to outer circumferences of the pipes 4, 5.

The cover plate 9 comprises a cover body 92 and a transparent protection plate 93. The cover body 92 includes a position-identification window 91 for identifying positions of butt edge surfaces 4a, 5a of the pipes 4, 5 to be welded, and the transparent protection plate 93 is used to cover the window 91. A laser passage opening 94 is formed on the protection plate 93 for guiding a laser beam (will be described later) emitted from the electrode position indicating means 6 into the welding device body 8. Preferably, the axial position of the laser passage opening 94 is formed to be consistent with the axial position of the welding electrode 22.

The installation portion 7 can be formed in a cylindrical shape with a bottom, and formed on the protection plate 93. A laser passage opening 71 is formed on the bottom of the installation portion 7 for guiding the laser beam (will be described later) emitted from the electrode position indicating means 6 into the welding device body 8. The shape of the laser passage opening 71 can be a circular or a regular polygon shape, etc. The inner diameter (the maximum diameter) of the laser passage opening 71 can be smaller than the shortest diameter of the laser beam emitted from the electrode position indicating means 6. The welding device body 8 can place the butt edge surfaces 4a, 5a of the pipes 4, 5 to be welded in a substantially sealed space S encompassed by the head unit 1, the first and the second extension portions 12, 13, the first and the second clamps 31, 32 and the cover plate 9.

The electrode position indicating means 6 comprises a laser oscillator (means for irradiating an indicating light) 61 and an emitting unit 62 for emitting the laser beam from the laser oscillator 61. The laser bean can be irradiated to the pipes 4, 5 to be welded at an axial position corresponding to the welding electrode 22. The electrode position indicating means 6 can be fixed to the installation portion 7 via the emitting unit 62, or detachable to the installation portion 7.

In addition, the aforementioned welding device can be an automatic welding device, which comprises driving means (not shown) and a control unit (not shown). The driving means can be a motor, etc. for rotationally driving the electrode unit 2 along the circumferential direction of the pipe, and the control unit is adapted to control a welding condition, such as a current value during the welding operation.

Next, a butt welding method for welding the pipes 4, 5 to be welded is described using the aforementioned welding device. The control unit previously sets a welding condition (current value, welding time, welding speed, atmosphere purge time, pulse time, etc.) according to a welding position (overhead position, flat position, horizontal position) varied by the rotation of the welding electrode 22.

The pipes 4, 5 to be welded are placed between the extension portions 12, 13 of the head unit 1. At this time, as described below, whether the positions (positions in the axial direction of the pipe) of the butt edge surfaces 4a, 5a of the pipes 4, 5 to be welded and the position of the welding electrode 22 are consistent are identified. As shown in FIG. 2, the laser oscillator 61 of the electrode position indicating means 6 is used to emit the laser beam L from the emitting unit 62. The laser beam L is irradiated from a direction substantially perpendicular to the axial direction of the pipes 4, 5 to be welded, passing through the laser passage opening 71 of the installation portion 7 and the laser passage opening 94 of the cover plate 9, and then to the pipes 4, 5 to be welded. The laser beam L is irradiated to the pipes 4, 5 to be welded at a position corresponding to the welding electrode 22.

At this time, the pipes 4, 5 to be welded can be positioned according to a laser beam irradiation position 10. In other words, when the axial positions of the butt edge surfaces 4a, 5a and the laser beam irradiation position 10 are not consistent, the pipes 4, 5 to be welded are moved along the axial direction to make the axial position of the butt edge surfaces 4a, 5a consistent with the laser beam irradiation position 10. In this way, the butt edge surfaces 4a, 5a are correctly consistent with the axial position of the welding electrode 22. The butt edge surfaces 4a, 5a and the laser bean irradiation position 10 can be affirmatively identified by eyes, even though in a substantially sealed space S encompassed by the base 11, the first and the second extension portions 12, 13, the first and the second clamps 31, 32 and the cover plate 9.

Next, the pipes 4, 5 to be welded are held by the first holders 33, 37 and the second holders 34, 38 of the clamps 31, 32. In this way, the pipes 4, 5 to be welded can be positioned under a condition that the butt edge surfaces 4a, 5a are butted to each other.

Next, the substantially-sealed space S of the welding device body 8 is filled with a sealing gas. The electrode unit 2 is rotated along the circumferential direction of the pipes 4, 5 to be welded, and the welding electrode 22 is used to weld the butt edge surfaces 4a, 5a over the entire circumference by arc welding. During the welding process, automatic welding of the pipes 4, 5 to be welded is preferred by optimizing the welding conditions, and via the control unit and driving the electrode unit 2.

Because the above welding device comprises the electrode position indicating means 6 for irradiating the laser beam L to the pipes 4, 5 to be welded at a position corresponding to the welding electrode 22, the following effects can be achieved.

First, the laser beam L corresponding to the position of the welding electrode 22 is directly irradiated to the pipes 4, 5 to be welded. By positioning the pipes 4, 5 to be welded according to the laser irradiation position 10, the butt edge surfaces 4a, 5a can be easily and correctly placed at a position corresponding to the welding electrode 22. Therefore, the butt edge surfaces 4a, 5a can be precisely welded by the welding electrode 22, and defective welding can be avoided. In particular, even though for an I-shape butt welding which is difficult to determine whether a good quality welding is carried out, defective welding can be also avoided. By contrast, in the conventional method of detecting the end position using a laser beam that projects the pipe and then reaches the receiving unit, the position detection accuracy is low and the welding position might deviate from the pipe end because the end position of the pipe is indirectly detected according to the amount of the laser beam reaching the receiving unit without irradiating the pipe.

Second, even though in a dark working environment, the laser beam irradiation position 10 can be easily identified and the positioning operation is easy because the pipes 4, 5 to be welded are positioned by irradiating the laser beam L.

Third, because the pipes 4, 5 to be welded can be positioned according to a relative position between the butt edge surfaces 4a, 5a and the laser beam irradiation position 10 on the pipes 4, 5 to be welded, the relative position can be correctly controlled regardless of the operator's observation position. Therefore, even though the pipe position is hard to identify from a front position due to a limitation of working area, a correct positioning is possible.

Fourth, since the welding device of the present invention is constructed by adding the installation portion 7 and the electrode position indicating means 6 to the conventional welding device shown in FIG. 3, the welding device of the present invention can be easily manufactured by including the installation portion 7 and the electrode positioning means 6 in the conventional welding device. Therefore, the cost can be reduced.

When positioning the pipes 4, 5 to be welded, the position of the laser beam L might deviate from its predetermined position due to a tiny shift of the installation position of the electrode position indicating means 6 with respect to the welding device body 8. In addition, an inexpensive laser pointer can be used as the laser oscillator 61, but in this case, the cross-sectional shape of the laser beam L irradiated to the pipes 4, 5 to be welded becomes an elliptical, rather than a circular. As a result, it is difficult to identify a correct position of the irradiated laser beam L.

As shown in FIG. 2, in the above welding device, because the inner diameter of the laser passage opening 71 is smaller than the shortest diameter of the laser beam (the emitting laser beam) L1 emitted from the laser oscillator 61, the position of the laser beam (irradiating laser beam) L2 irradiated to the pipes 4, 5 to be welded can still correspond to the laser passing opening 71 even though the position of the emitting laser beam L1 is deviated. Hence, the irradiation position 10 of the irradiating laser beam L2 can be fixed. Moreover, the shape of the irradiating laser beam L2 can be a shape corresponding to the laser passage opening 71 (for example, a circle), and thus the irradiating laser beam L2 can be easily identified. Therefore, the accuracy of positioning the pipes 4, 4 to be welded can be increased. In addition, even though an inexpensive laser pointer is used, the cost can be reduced because the irradiating laser beam L2 can be easily identified.

Because the electrode position indicating means 5 can irradiate the laser beam to the pipes 4, 5 to be welded so as to make the laser beam irradiation position 10 to be consistent with the axial position of the welding electrode 22, the butt edge surfaces 4a, 5a and the axial position of welding electrode 22 can be consistent by matching the butt edge surfaces 4a, 5a with the laser beam irradiation position 10. Therefore, positioning the pipes 4, 5 to be welded can become easier.

In the aforementioned welding device, although the butt edge surfaces 4a, 5a are set in the substantially-sealed space S, the position of the welding electrode 22 can be easily and visually identified and the pipes 4, 5 to be welded can be easily positioned because the position of the welding electrode 22 is directly indicated on the pipes 4, 5 to be welded by irradiating the laser beam.

Additionally, in some cases, it needs to prepare a plurality of welding device bodies 8 according to the diameter of the pipes 4, 5 to be welded in order to correspond plural pipes with different diameters. In the above welding device, a plurality of electrode position indicating means 6 are not necessarily required for the welding device bodies 8 because the electrode position indicating means 6 is detachable from the welding device bodies 8. For example, a plurality of welding device bodies 8 can share one common electrode position indicating means 6. Therefore, the welding device of the present invention is advantageous in reducing cost.

According to the welding method described above, because the laser beam is irradiated to the pipes 4, 5 to be welded at the position corresponding to the welding electrode 22 and the welding is performed after the pipes 4, 5 to be welded are positioned according to the laser irradiation position 10, the butt edge surfaces 4a, 5a can be easily and correctly arranged at the position corresponding to the welding electrode 22. Therefore, the butt edge surfaces 4a, 5a can be reliably welded and defective welding can be avoided.

In addition, for welding pipes with different diameters, a plurality of clamps 31, 32 of various sizes in diameter can be prepared corresponding to pipes with different diameters. The clamps 31, 32 suitable to the pipes can be selected according to the size of the pipes to be welded. In this way, one common head unit 1 can be applied to pipes with different diameters. Furthermore, the pipes 4, 5 to be welded can be positioned after the pipes 4, 5 to be welded are linked by temporally fixing the pipes 4, 5 to each other by welding, etc. in advance. In particular, when the diameters of the pipes 4, 5 to be welded are large, because the occurrence of difference between the outer diameter of the pipe and the inner diameters of the clamps 31, 32 is usually large and therefore a position deviation occurs easily, and therefore the aforementioned temporal fixation method for the pipes 4, 5 to be welded is effective. Whether the pipes 4, 5 to be welded are temporally fixed can be determined according to whether the pipes 4, 5 to be welded are exactly positioned to the device by the fixing clamp 3.

The embodiment described above shows an example of the electrode position indicating means 6 installed onto the installation portion 7 formed on the protection plate 93. However, the installation position of the electrode position indicating means 6 can be at any position that allows the laser beam to irradiate the pipes 4, 5 to be welded. For example, the installation and the laser passage opening can be formed on the head unit 1. Furthermore, if the installation portion 7 can formed in a structure capable of trimming its position by using position-adjusting screws, the position of the laser passage opening 71 can be optimized. In addition, the indicating light used in the present invention is not limited to the laser beam, other light sources can be also used.

Because the above welding device comprises the electrode position indicating means for irradiating the indicating light to the pipes to be welded at a position corresponding to the welding electrode, the following effects can be achieved.

(1) By positioning the pipes to be welded according to the indicating light irradiation position, the butt edge surfaces can be easily and correctly placed at a position corresponding to the welding electrode. Therefore, the butt edge surfaces can be precisely welded by the welding electrode, and defective welding can be avoided. In particular, the effect is obvious for an I-shape butt welding.

(2) Because the pipes to be welded are positioned by irradiating the indicating light, the indicating light irradiation position can be easily identified, and the positioning operation is easy even in a dark working environment.

(3) Because the pipes to be welded can be positioned according to a relative position between the butt edge surfaces and the indicating light irradiation position on the pipes to be welded, the relative position can be correctly controlled regardless of the operator's observation position. Therefore, even though the pipe position is hard to identify from a front position due to a limitation of working space, a correct positioning is possible.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A welding device, for butt welding two pipes to be welded, the welding device comprising:

a welding device body, comprising an electrode unit with a welding electrode, a fixing clamp for holding the pipes to be welded, and a transparent protection plate allowing the pipes to be seen from outside of the welding device body; and electrode position indicating means for indicating a position of the welding electrode with respect to the pipes to be welded, disposed outside the welding device body, wherein the electrode position indicating means irradiates an indicating light through the transparent protection plate to the pipes to be welded at the position corresponding to the welding electrode.

2. The welding device of claim 1, wherein the electrode position indicating means irradiates the indicating light to the pipes to be welded in a manner that an irradiation position is consistent with a position of the welding electrode with respect to an axial direction of the pipe.

3. The welding device of claim 1, wherein the welding device body places butt edge surfaces of the pipes to be welded in a substantially sealed space.

4. The welding device of claim 1, wherein the electrode position indicating means is detachably installed to the welding device body.

5. The welding device of claim 1, wherein a light passage opening is formed on the welding device body for guiding the indicating light emitted from the electrode position indicating means into the welding device body, and an inner diameter of the light passage opening is smaller than a shortest diameter of the indicating light emitted from the electrode position indicating means.

6. A butt welding method for welding two pipes to be welded, comprising:

providing a welding device body that comprises a welding electrode for welding the pipes and a transparent protection plate allowing the pipes to be seen from outside of the welding device body;

irradiating an indicating light through the transparent protection plate to the pipes to be welded at a position corresponding to a welding electrode;

positioning the pipes to be welded through the transparent protection plate according to an irradiation position of the indicating light; and welding the two pipes by using the welding electrode.

* * * * *